United States Patent [19] [11] Patent Number: 4,904,766
Yokogawa et al. [45] Date of Patent: Feb. 27, 1990

[54] MONOAZO COMPOUND HAVING TWO VINYLSULFONE TYPE FIBER REACTIVE GROUPS THROUGH TRIAZINYL BRIDGING GROUP

[75] Inventors: Kazufumi Yokogawa; Toshihiko Morimitsu, both of Minoo; Naoki Harada, Suita; Takashi Omura, Ashiya; Sadanobu Kikkawa, Minoo, all of Japan

[73] Assignee: Sumitomo Chemical Company, Limited, Osaka, Japan

[21] Appl. No.: 106,798

[22] Filed: Oct. 13, 1987

[30] Foreign Application Priority Data

Oct. 17, 1986 [JP] Japan .................. 61-248201
Dec. 9, 1986 [JP] Japan .................. 61-294514

[51] Int. Cl.$^4$ .............. C09B 62/503; C09B 62/51; D06P 3/66; D06P 1/384
[52] U.S. Cl. .................. 534/642; 534/598; 534/637; 534/638; 534/887
[58] Field of Search .............. 534/642, 617, 632, 638, 534/635, 636

[56] References Cited

U.S. PATENT DOCUMENTS 4,341,699  7/1982  Tezuka et al. ............ 534/642 X
4,378,313  3/1983  Kayane et al. ........... 534/642 X
4,540,418  9/1985  Otake et al. ............. 534/642 X
4,548,612 10/1985  Kayane et al. ........... 534/642 X
4,667,022  5/1987  Nakamatzu et al. ........ 534/642 X
4,686,286  8/1987  Niwa et al. ............. 534/642 X

FOREIGN PATENT DOCUMENTS 0076782  4/1983  European Pat. Off. ........... 534/642
1350612 12/1963  France ........................ 534/642
 191755 11/1983  Japan ......................... 534/642

Primary Examiner—Floyd D. Higel
Attorney, Agent, or Firm—Stevens, Davis, Miller & Mosher

[57] ABSTRACT

A monoazo compound represented by the following formula in a free acid form,

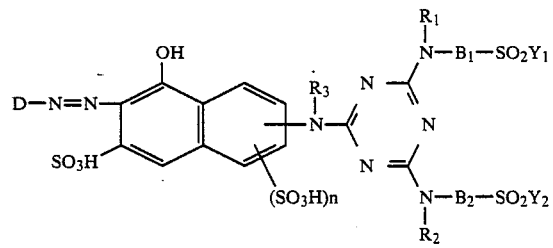

wherein D is a sulfophenyl or sulfonaphthyl, $R_1$, $R_2$ and $R_3$ are independently hydrogen or alkyl; $B_1$ and $B_2$ are independently phenylene, naphthylene, or alkylene, provided that at least one of $B_1$ and $B_2$ is phenylene or naphthylene, $Y_1$ and $Y_2$ are independently vinyl or —$CH_2CH_2Z$ in which Z is splittable by the action of an alkali, and n is 0 or 1, and the monoazo compound is useful for dyeing or printing fiber materials to obtain dyed or printed products of extremely deep scarlet color excellent in various fastness with superior build-up property.

12 Claims, No Drawings

MONOAZO COMPOUND HAVING TWO VINYLSULFONE TYPE FIBER REACTIVE GROUPS THROUGH TRIAZINYL BRIDGING GROUP

The present invention relates to a monoazo compound, a process for producing the same and a process for dyeing or printing fiber materials. More specifically, the present invention relates to a water soluble monoazo compound having two vinylsulfone type fiber reactive groups a molecule, which is particularly useful for dyeing or printing hydroxy- or carbonamide-containing fiber materials, particularly those such as cellulose fiber, natural or synthetic polyamide or polyurethane fiber or leather, or their mixed fibers, in a scarlet color.

Reactive dyes, particularly so-called vinyl-sulfone type reactive dyes have been extensively used for dyeing or printing fiber materials such as cellulose fiber and polyamide fiber because of being applicable to various dyeing or printing methods and giving dyed products of a brilliant color shade having superior wet fastness properties.

For example, in Published Unexamined Japanese Patent Application No. 191755/1983, and in "Kagaku to Kougyo" (Science and Industry), Vol. 42, No. 11, reactive dyes of the following formulas,

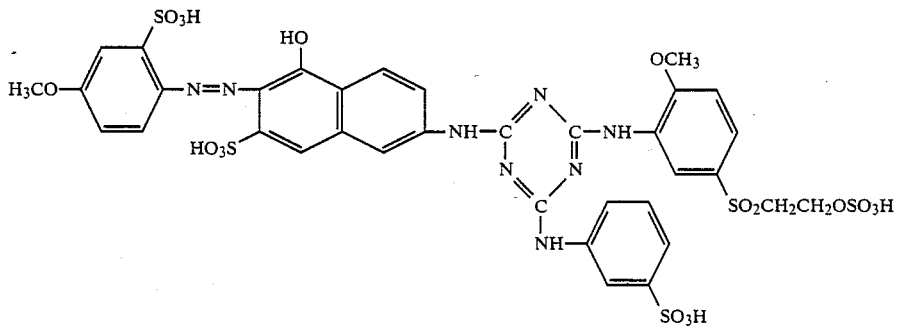

and

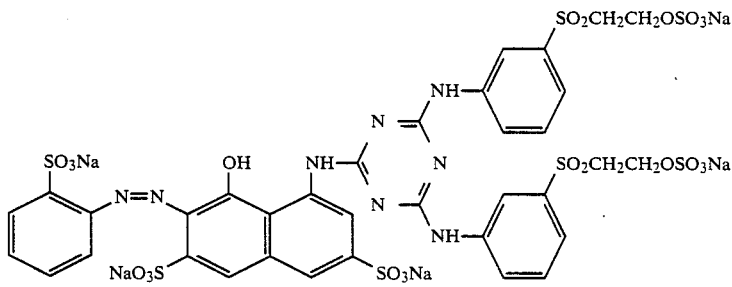

are disclosed, respectively.

However, known dyes of this kind including the above two can hardly give dyed products of a deep color because of their insufficient dyeability, so that dyeing efficiency in a dye house decreases from viewpoint of dyeing cost and treatment of waste water. Thus, such known reactive dyes await for improvements in particularly their dyeability.

The present inventors have undertaken extensive studies to find a reactive dye of this kind with excellence in various dye performances such as water solubility, level-dyeing property and fastness properties as well as dyeability, and found a fact that a specific monoazo compound having two vinylsulfone type fiber reactive groups a molecule can meet needs described above.

The present invention provides a monoazo compound represented by the following formula (I) in a free acid form,

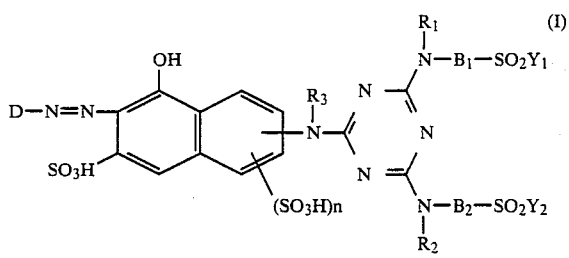

wherein D is a sulfophenyl group of the following formula in a free acid form,

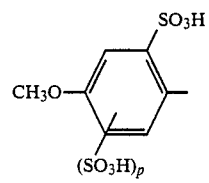

in which p is 0 or 1, or a sulfonaphthyl group of the following formula in a free acid form,

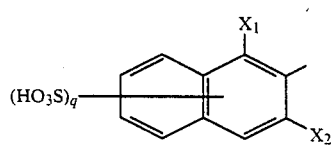

in which any one of $X_1$ and $X_2$ is sulfo and the other is hydrogen, and q is 0, 1 or 2; $R_1$, $R_2$ and $R_3$ independently of one another are each hydrogen or an unsubstituted or substituted alkyl group; $B_1$ and $B_2$ independently of one another are each an unsubstituted or substituted phenylene, naphthylene or alkylene group, provided that at least one of $B_1$ and $B_2$ is the phenylene or naphthylene; $Y_1$ and $Y_2$ independently of one another are each $-CH=CH_2$ or $-CH_2CH_2Z$ in which Z is a group splittable by the action of an alkali; and n is 0 or 1; and a process for producing the monoazo compound of the formula (I), which comprises subjecting a cyanuric halide, an aminonaphthalenesulfonic acid represented by the following formula (II) in a free acid form,

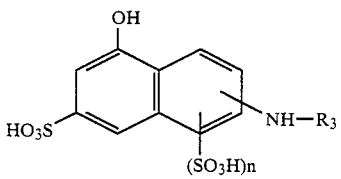　(II)

wherein $R_3$ and n are as defined above, an aromatic amine compound represented by the following formula (III), $$D-NH_2 \quad (III)$$

wherein D is as defined above, an amine compound represented by the following formula (IV),

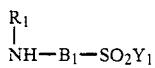　(IV)

wherein $R_1$, $B_1$ and $Y_1$ are as defined above, and another amine compound represented by the following formula (V),

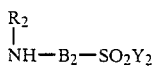　(V)

wherein $R_2$, $B_2$ and $Y_2$ are as defined above, to reaction in an aqueous medium.

The present invention also provides a process for dyeing or printing fiber materials, which comprises using the monoazo compound of the formula (I).

In the present invention, the alkyl represented by $R_1$, $R_2$ and $R_3$ is preferably the one having 1 to 4 carbon atoms and unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl. Preferred examples of such alkyl are those described in Published Unexamined Japanese Patent Application No. 122549/1984. Particularly preferred $R_1$, $R_2$ and $R_3$ are, independently of one another, each hydrogen, methyl or ethyl. In the present invention, much preferred is a case where any one of $R_1$ and $R_2$ is hydrogen, and $R_3$ is hydrogen or methyl.

The phenylene represented by $B_1$ and $B_2$ may be unsubstituted or substituted with one or two members selected from methyl, methoxy, ethyl, ethoxy, chloro, bromo, sulfo and carboxy. Preferred examples are as follows.

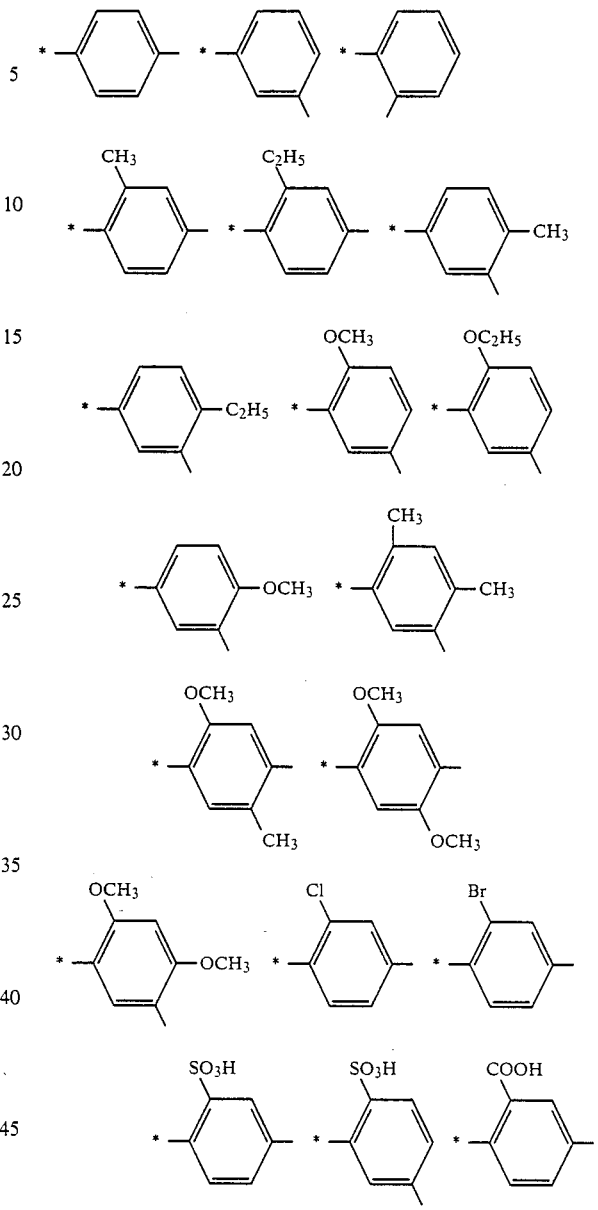

In the above formulas, the asterisked linkage is bonded to $-NR_1-$ or $-NR_2-$.

The naphthylene represented by $B_1$ and $B_2$ may be unsubstituted or substituted with a sulfo and includes, for example,

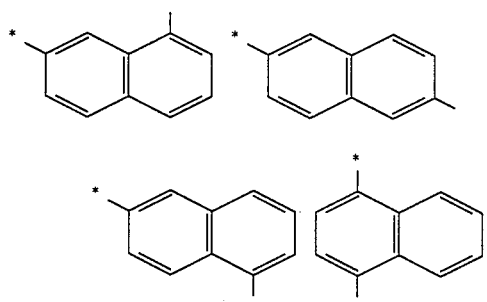

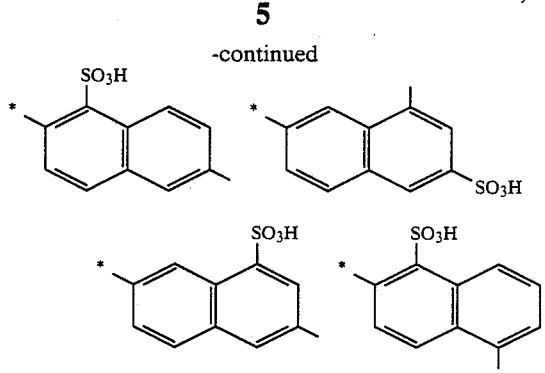

wherein the asterisked linkage is as defined above.

The alkylene represented by $B_1$ and $B_2$ may be straight or branched and preferably the one having 1 to 8 carbon atoms. Preferred examples are as follows.

\*—$CH_2CH_2$—, \*—$CH_2CH_2CH_2$—, \*—$CH_2CH_2CH_2CH_2$—,

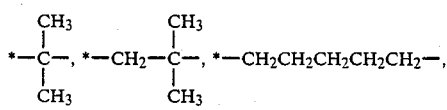

\*—$CH_2CH_2CH_2CH_2CH_2CH_2$—

In the above, the asterisked linkage is as defined above.

The symbol Z in —$CH_2CH_2Z$ which is represented by $Y_1$ and $Y_2$ denotes a group capable of being split by the action of an alkali, and includes, for example, sulfuric acid ester, thiosulfuric acid ester, acetic acid ester or phosphoric acid ester group, and halogen atoms. Of these groups represented by $Y_1$ and $Y_2$, preferred is β-sulfatoethyl (—$CH_2CH_2OSO_3H$) which may be incorporated with vinyl (—$CH=CH_2$).

Among the monoazo compounds of the formula (I), preferred is a monoazo compound represented by the following formula in a free acid form,

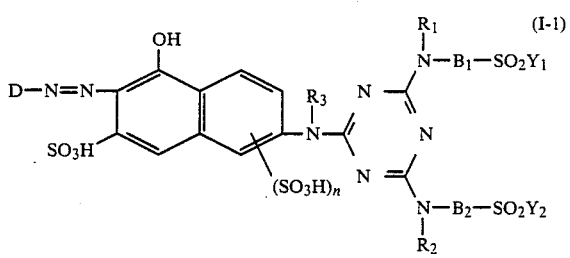

wherein D, $R_1$, $R_2$, $R_3$, $B_1$, $B_2$, $Y_1$, $Y_2$ and n are as defined above. More specifically, preferred are those represented by the following formulas (I-2), (I-3) and (I-4);

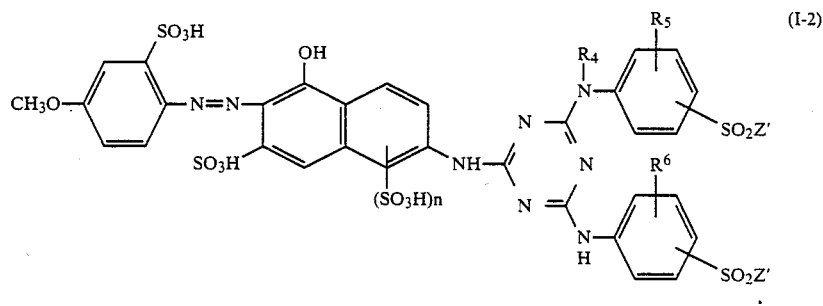

wherein $R_4$ is hydrogen, methyl or ethyl, $R_5$ and $R_6$ independently of one another are each hydrogen, methyl or methoxy, Z' is —$CH_2CH_2OSO_3H$ or —$CH=CH_2$, and n is as defined above,

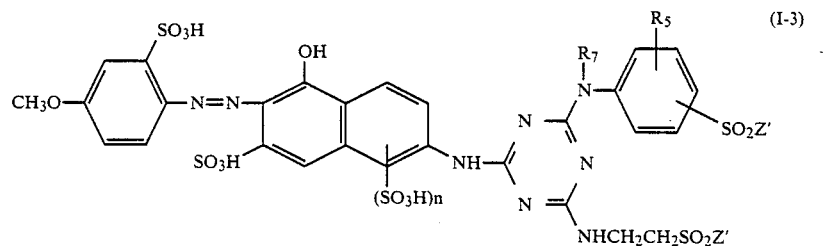

wherein $R_7$ is hydrogen, methyl or ethyl, and $R_5$, Z' and n are as defined above, and

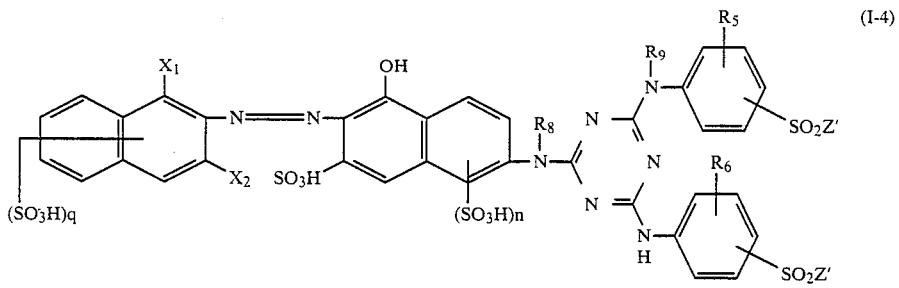

wherein $R_8$ and $R_9$ independently of one another are each hydrogen, methyl or ethyl, and $R_5$, $R_6$, $X_1$, $X_2$, $Z'$, n and q are as defined above.

The monoazo compound (I) of the present invention can be produced in a manner known per se by subjecting a cyanuric halide such as cyanuric chloride, the aminonaphthalene sulfonic acid of the formula (II), the aromatic amine compound of the formula (III), the amine compound of the formula (IV) and another amine compound of the formula (V) to reaction in an aqueous medium.

The order of reactions is not particularly limited. However, considering the reaction rate and quality of the monoazo compound obtained, it is preferred for the condensation reaction with the cyanuric halide to use any one having the lowest reactivity to the cyanuric halide first of all. For example, the aminonaphthalene sulfonic acid (II) is first subjected to condensation reaction with the cyanuric halide in an aqueous medium at a temperature of 0° to 50° C., preferably 0° to 30° C., within a pH of 1 to 10, preferably 2 to 7. Successively, the resulting condensate is subjected to coupling reaction with a diazonium salt of the aromatic amine compound (III) in an aqueous medium at a temperature of $-10°$ to 30° C., preferably 0° to 5° C. within a pH of 1 to 10, preferably 3 to 7, whereby there is obtained a dihalogenotriazinyl compound represented by the following formula (V) in a free acid form,

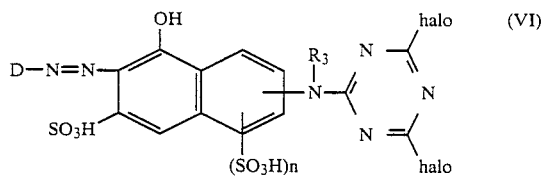

wherein D, $R_3$ and n are as defined above, and halo is halogeno. The diazonium salt of the aromatic amine compound (III) can be obtained in a conventional manner using, for example, sodium nitrite and a mineral acid.

Successively, the dihalogenotriazinyl compound (VI) is subjected to the second condensation reaction with any one of the amine compound (IV) or another amine compound (V), followed by the third condensation reaction with the remaining one. The second condensation reaction can be carried out in an aqueous medium at a temperature of 0° to 70° C., preferably 10° to 50° C. within a pH of 2 to 9, preferably 3 to 6, and the third condensation also in an aqueous medium at a temperature of 30° to 100° C., preferably 50° to 90° C. within a pH of 2 to 9, preferably 3 to 7, whereby there can be obtained efficiently the desired monoazo compound (I).

The starting compounds described above may be used in the form of a free acid or an alkaline earth or alkali metal salt depending on the reaction conditions.

After completion of the reactions, the monoazo compound (I) containing reaction mixture may be subjected to salting-out in a conventional manner, demineralization with a semipermeable membrane, evaporation such as spray-drying or the like, if desired, with use of usual auxiliary agents such as stabilizing agents, dyeing improvers and the like, to provide a pulverulent or liquid commercial product.

The monoazo compound (I) in accordance with the present invention may be in the form of a free acid or a salt of an alkali metal or an alkaline earth metal, preferably in the form of sodium or potassium salt.

The monoazo compound (I) of the present invention is fiber-reactive and useful for dyeing or printing hydroxyl group-containing and amide group-containing materials. The materials are favorably in a fibrous form including unmixed or mixed fiber spinning.

The hydroxyl group-containing materials include natural or synthetic hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wool, cellulose/acryl and the like.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a similar manner, which can be selected from conventional manners depending on the physical and chemical properties of said fiber materials.

For example, cellulose fiber materials can be dyed using the monoazo compound (I) by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt usable for promoting the exhaustion may be added to a dye bath before or after temperature reaches a desired level for the dyeing, if desired, dividedly.

The padding can be carried out by padding the fiber materials at ambient temperature or an elevated temperature, and after drying, steaming or dry-heating the materials to perform the dye-fixation.

The cold batch-up dyeing can be carried out by padding the fiber materials with a padding liquor at ambient temperature, batching up and allowing them to stand on a roller for 3 hours or more or over night, followed by washing with water and drying.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or an emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of neutral or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzene-sulfonic acid or aminonaphthalenesulfonic acid, or an addition product between stearylamine and ethylene oxide, and the like.

The present monoazo compound (I) can be characterized by excellent dye performances in the dyeing and printing of fiber materials, particularly cellulose fiber materials. For example, the compound can give a dyed product excellent in light fastness, perspiration-light fastness, formalin fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The monoazo compound (I) can also exhibit extremely excellent build-up, level-dyeing and washing-off properties and high solubility as well as high exhaustion and fixation percentages. Moreover, when used for the dyeing or printing, the monoazo compound (I) can hardly be affected by changes in a dyeing temperature, an alkali agent, an amount of inorganic salts and bath ratio, so that a dyed or printed product with a constant quality can be obtained with superior reproducibility.

Further, particularly when applied for the dyeing by the cold batch-up dyeing method, the monoazo compound (I) can exhibit excellent build-up property and alkali stability (almost no hydrolysis by the action of the alkali agent) and almost no difference in the depth and shape appears between the dyed products obtained by fixing at 25° and at a lower temperature than that.

The present invention is illustrated in more detail with reference to the following Examples, which are only illustrative, but not limitative. In Examples, all parts and % are by weight.

EXAMPLE 1

Into a dispersion of cyanuric chloride (7.4 parts) and water (50 parts) was added a neutral aqueous solution (100 parts) of 6-amino-1-hydroxynaphthalene-3-sulfonic acid (9.8 parts), and stirring was continued at 0° to 5° C. with a pH of 2 to 4 until the starting 6-amino-1-hydroxynaphthalene-3-sulfonic acid disappeared. A diazonium salt of p-anisidine-m-sulfonic acid (9.0 parts) prepared in advance in a conventional manner was added to the above first condensation reaction mixture, and the mixture was stirred at 10° to 15° C. within a pH of 6 to 8 to complete the coupling reaction. Thereafter, N-ethylaniline-3-β-sulfatoethylsulfone (13.6 parts) was added thereto, and the mixture was stirred at 30° to 50° C. within a pH of 4 to 6 to complete a second condensation reaction. Successively, 1-aminobenzene-3-β-sulfatoethylsulfone (34 parts) was added to the second condensation reaction mixture, and the resulting mixture was stirred at 50° to 60° C. within a pH of 4 to 6 to complete the third condensation reaction. Thereafter, potassium chloride was added to the reaction mixture, and the precipitate separated by filtration was washed and dried to obtain a monoazo compound (30 parts) of the following formula in a free acid form.

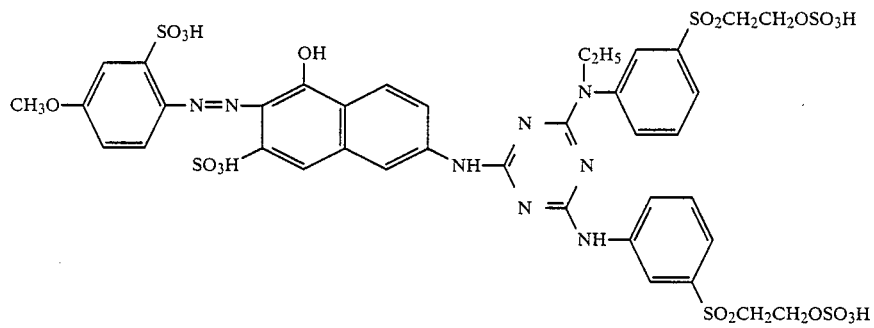

λmax 500 nm (water)

EXAMPLE 2

Example 1 was repeated using the same amine components, provided that 6-amino-1-hydroxynaphthalene-3,5-disulfonic acid was used as the azo component to be subjected to the first condensation with cyanuric chloride, thereby obtaining a monoazo compound of the following formula in a free acid form.

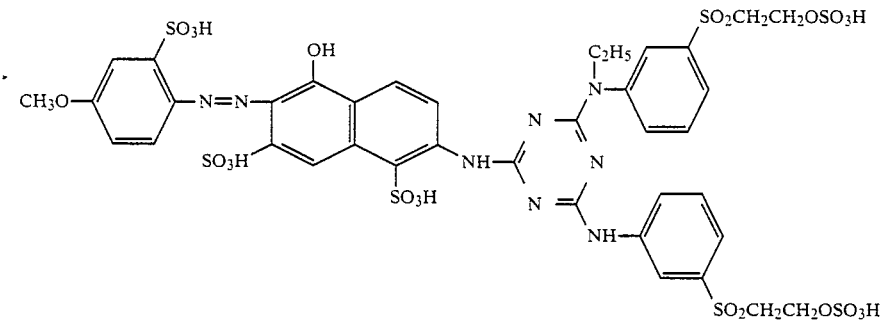

λmax 505 nm (water)

EXAMPLE 3

Example 1 was repeated, except that the second condensation was carried out at 30° to 50° C. within a pH of 6 to 8 using β-(β-sulfatoethylsulfonyl)-ethylamine in place of N-ethylaniline-3-β-sulfatoethylsulfone, thereby obtaining a monoazo compound of the following formula in a free acid form.

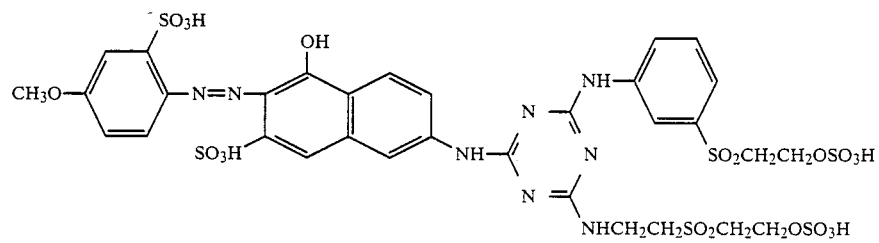

λmax 503 nm (water)

EXAMPLE 4

Using the aminonaphthalene sulfonic acid of the formula (II) (the azo component to be subjected to first condensation with cyanuric chloride), the aromatic amine compound of the formula (III) (the diazo component), the amine compound of the formula (IV) (the second condensation amine component) and another amine compound of the formula (V) (the third condensation amine component) as shown in columns A, B, C and D of the following table, respectively, the corresponding monoazo compounds characterized by a color shade on cellulose fibers as shown in column E were obtained in a manner similar to that of Example 1.

| | A<br>Azo<br>component<br>(II) | B<br>Diazo<br>component<br>(III) | C<br>Second condensation<br>amine component<br>(IV) | D<br>Third condensation<br>amine component<br>(V) | E<br>Shade<br>on cell-<br>ulose |
|---|---|---|---|---|---|
| 1 | 6-Amino-1-<br>hydroxynaphth- | p-Anisi-<br>dine-m- | N—Ethylaniline-3-<br>β-sulfatoethyl- | 1-Aminobenzene-<br>4-β-sulfatoethyl | Scarlet |

| | A<br>Azo component<br>(II) | B<br>Diazo component<br>(III) | C<br>Second condensation amine component<br>(IV) | D<br>Third condensation amine component<br>(V) | E<br>Shade on cellulose |
|---|---|---|---|---|---|
| | alene-3-sulfonic acid | sulfonic acid | sulfone | sulfone | |
| 2 | 6-Amino-1-hydroxynaphthalene-3-sulfonic acid | p-Anisidine-m-sulfonic acid | N—Ethylaniline-3-β-sulfatoethylsulfone | N—Ethylaniline-3-β-sulfatoethylsulfone | Scarlet |
| 3 | 6-Amino-1-hydroxynaphthalene-3-sulfonic acid | p-Anisidine-m-sulfonic acid | N—Ethylaniline-3-β-sulfatoethylsulfone | N—Methylaniline-3-β-sulfatoethylsulfone | Scarlet |
| 4 | 6-Amino-1-hydroxynaphthalene-3-sulfonic acid | p-Anisidine-m-sulfonic acid | 1-Aminobenzene-4-β-sulfatoethylsulfone | 1-Aminobenzene-3-β-sulfatoethylsulfone | Scarlet |
| 5 | 6-Amino-1-hydroxynaphthalene-3-sulfonic acid | p-Anisidine-m-sulfonic acid | 1-Aminobenzene-β-sulfatoethylsulfone | 1-Aminobenzene-4-β-sulfatoethylsulfone | Scarlet |
| 6 | 6-Amino-1-hydroxynaphthalene-3-sulfonic acid | p-Anisidine-m-sulfonic acid | 1-Aminobenzene-3-β-sulfatoethylsulfone | 1-Aminobenzene-3-β-sulfatoethylsulfone | Scarlet |
| 7 | 6-Amino-1-hydroxynaphthalene-3-sulfonic acid | p-Anisidine-m-sulfonic acid | N—Methylaniline-3-β-sulfatoethylsulfone | 1-Aminobenzene-3-β-sulfatoethylsulfone | Scarlet |
| 8 | 6-Amino-1-hydroxynaphthalene-3-sulfonic acid | p-Anisidine-m-sulfonic acid | N—Methylaniline-3-β-sulfatoethylsulfone | 1-Aminobenzene-4-β-sulfatoethylsulfone | Scarlet |
| 9 | 6-Amino-1-hydroxynaphthalene-3-sulfonic acid | p-Anisidine-m-sulfonic acid | N—Ethylaniline-4-β-sulfatoethylsulfone | 1-Aminobenzene-3-β-sulfatoethylsulfone | Scarlet |
| 10 | 6-Amino-1-hydroxynaphthalene-3-sulfonic acid | p-Anisidine-m-sulfonic acid | N—Ethylaniline-3-β-sulfatoethylsulfone | 1-Aminobenzene-4-β-sulfatoethylsulfone | Scarlet |
| 11 | 6-Amino-1-hydroxynapthalene-3-sulfonic acid | p-Anisidine-m-sulfonic acid | N—Ethylaniline-3-β-sulfatoethylsulfone | N—Ethylaniline-3-β-sulfatoethylsulfone | Scarlet |
| 12 | 6-Amino-1-hydroxynaphthalene-3-sulfonic acid | p-Anisidine-m-sulfonic acid | N—Propylaniline-3-β-sulfatoethylsulfone | 1-Aminobenzene-3-β-sulfatoethylsulfone | Scarlet |
| 13 | 6-Amino-1-hydroxynaphthalene-3-sulfonic acid | p-Anisidine-m-sulfonic acid | 2-Aminonaphthalene-6-β-sulfatoethylsulfone | 1-Aminobenzene-3-β-sulfatoethylsulfone | Scarlet |
| 14 | 6-Amino-1-hydroxynaphthalene-3-sulfonic acid | p-Anisidine-m-sulfonic acid | 2-Aminonaphthalene-8-β-sulfatoethylsulfone | 1-Aminobenzene-3-β-sulfatoethylsulfone | Scarlet |
| 15 | 6-Amino-1-hydroxynaphthalene-3-sulfonic acid | p-Anisidine-m-sulfonic acid | 2-Aminonaphthalene-6-β-sulfatoethylsulfone-1-sulfonic acid | 1-Aminobenzene-3-β-sulfatoethylsulfone | Scarlet |
| 16 | 6-Amino-1-hydroxynaphthalene-3-sulfonic acid | p-Anisidine-m-sulfonic acid | 2-Aminonaphthalene-8-β-sulfatoethylsulfone-6-sulfonic acid | 1-Aminobenzene-3-β-sulfatoethylsulfone | Scarlet |
| 17 | 6-Amino-1-hydroxynaphthalene-3-sulfonic acid | p-Anisidine-m-sulfonic acid | 2-Aminonaphthalene-6-β-sulfatoethylsulfone-1-sulfonic acid | 2-Aminonaphthalene-6-β-sulfatoethylsulfone | Scarlet |
| 18 | 6-Amino-1-hydroxynaphthalene-3-sulfonic acid | p-Anisidine-m-sulfonic acid | 2-Aminonaphthalene-6-β-sulfatoethylsulfone-1-sulfonic acid | 1-Aminobenzene-4-β-sulfatoethylsulfone | Scarlet |
| 19 | 6-Amino-1-hydroxynaphthalene-3-sulfonic acid | p-Anisidine-m-sulfonic acid | N—Ethylaniline-3-β-sulfatoethylsulfone | 1-Aminobenzene-3-vinylsulfone | Scarlet |
| 20 | 6-Amino-1-hydroxynaphthalene-3-sulfonic acid | p-Anisidine-m-sulfonic acid | N—Ethylaniline-3-vinylsulfone | 1-Aminobenzene-3-β-sulfatoethylsulfone | Scarlet |

-continued

| | A<br>Azo component<br>(II) | B<br>Diazo component<br>(III) | C<br>Second condensation amine component<br>(IV) | D<br>Third condensation amine component<br>(V) | E<br>Shade on cellulose |
|---|---|---|---|---|---|
| 21 | 6-Amino-1-hydroxynaphthalene-3,5-disulfonic acid | p-Anisidine-m-sulfonic acid | 1-Aminobenzene-4-β-sulfatoethylsulfone | 1-Aminobenzene-4-β-sulfatoethylsulfone | Scarlet |
| 22 | 6-Amino-1-hydroxynaphthalene-3,5-disulfonic acid | p-Anisidine-m-sulfonic acid | 1-Aminobenzene-4-β-sulfatoethylsulfone | 1-Aminobenzene-3-β-sulfatoethylsulfone | Scarlet |
| 23 | 6-Amino-1-hydroxynaphthalene-3,5-disulfonic acid | p-Anisidine-m-sulfonic acid | 1-Aminobenzene-3-β-sulfatoethylsulfone | 1-Aminobenzene-3-β-sulfatoethylsulfone | Scarlet |
| 24 | 6-Amino-1-hydroxynaphthalene-3,5-disulfonic acid | p-Anisidine-m-sulfonic acid | N—Ethylaniline-3-β-sulfatoethylsulfone | 1-Aminobenzene-4-β-sulfatoethylsulfone | Scarlet |
| 25 | 6-Amino-1-hydroxynaphthalene-3,5-disulfonic acid | p-Anisidine-m-sulfonic acid | 2-Aminonaphthalene-8-β-sulfatoethylsulfone | 1-Aminobenzene-3-β-sulfatoethylsulfone | Scarlet |
| 26 | 6-Amino-1-hydroxynaphthalene-3,5-disulfonic acid | p-Anisidine-m-sulfonic acid | 2-Aminonaphthalene-6-β-sulfatoethylsulfone | 1-Aminobenzene-3-β-sulfatoethylsulfone | Scarlet |
| 27 | 6-Amino-1-hydroxynaphthalene-3,5-disulfonic acid | p-Anisidine-m-sulfonic acid | 2-Aminonaphthalene-6-β-sulfatoethylsulfone | 1-Aminobenzene-4-β-sulfatoethylsulfone | Scarlet |
| 28 | 6-Amino-1-hydroxynaphthalene-3,5-disulfonic acid | p-Anisidine-m-sulfonic acid | 2-Aminonaphthalene-6-β-sulfatoethylsulfone-1-sulfonic acid | 1-Aminobenzene-3-β-sulfatoethylsulfone | Scarlet |
| 29 | 6-Amino-1-hydroxynaphthalene-3-sulfonic acid | 4-Aminoanisole-2,5-disulfonic acid | 1-Aminobenzene-4-β-sulfatoethylsulfone | 1-Aminobenzene-3-β-sulfatoethylsulfone | Scarlet |
| 30 | 6-Amino-1-hydroxynaphthalene-3-sulfonic acid | 4-Aminoanisole-2,5-disulfonic acid | 1-Aminobenzene-4-β-sulfatoethylsulfone | 1-Aminobenzene-4-β-sulfatoethylsulfone | Scarlet |
| 31 | 6-Amino-1-hydroxynaphthalene-3-sulfonic acid | 4-Aminoanisole-2,5-disulfonic acid | 1-Aminobenzene-3-β-sulfatoethylsulfone | 1-Aminobenzene-3-β-sulfatoethylsulfone | Scarlet |
| 32 | 6-Amino-1-hydroxynaphthalene-3-sulfonic acid | 4-Aminoanisole-2,5-disulfonic acid | N—Ethylaniline-3-β-sulfatoethylsulfone | 1-Aminobenzene-3-β-sulfatoethylsulfone | Scarlet |
| 33 | 6-Amino-1-hydroxynaphthalene-3-sulfonic acid | 4-Aminoanisole-2,5-disulfonic acid | N—Ethylaniline-3-β-sulfatoethylsulfone | 1-Aminobenzene-4-β-sulfatoethylsulfone | Scarlet |
| 34 | 6-Amino-1-hydroxynaphthalene-3-sulfonic acid | 4-Aminoanisole-2,5-disulfonic acid | N—Ethylaniline-3-β-sulfatoethylsulfone | 1-Aminobenzene-3-vinylsulfone | Scarlet |
| 35 | 6-Amino-1-hydroxynaphthalene-3-sulfonic acid | 4-Aminoanisole-2,5-disulfonic acid | 2-Aminonaphthalene-6-β-sulfatoethylsulfone | 1-Aminobenzene-3-β-sulfatoethylsulfone | Scarlet |
| 36 | 6-Amino-1-hydroxynaphthalene-3-sulfonic acid | 4-Aminoanisole-2,5-disulfonic acid | 2-Aminonaphthalene-8-β-sulfatoethylsulfone | 1-Aminobenzene-3-β-sulfatoethylsulfone | Scarlet |
| 37 | 6-Amino-1-hydroxynaphthalene-3-sulfonic acid | p-Anisidine-m-sulfonic acid | 1-Amino-2-methoxybenzene-5-β-sulfatoethylsulfone | 1-Aminobenzene-3-β-sulfatoethylsulfone | Scarlet |
| 38 | 6-Amino-1-hydroxynaphthalene-3- | p-Anisidine-m-sulfonic acid | 1-Amino-4-methoxybenzene-3-β-sulfatoethylsulfone | 1-Aminobenzene-3-β-sulfatoethylsulfone | Scarlet |

-continued

| | A<br>Azo component<br>(II) | B<br>Diazo component<br>(III) | C<br>Second condensation amine component<br>(IV) | D<br>Third condensation amine component<br>(V) | E<br>Shade on cellulose |
|---|---|---|---|---|---|
| 39 | sulfonic acid<br>6-Amino-1-hydroxynaphthalene-3,5-disulfonic acid | p-Anisidine-m-sulfonic acid | 1-Amino-2-methoxy-5-methylbenzene-4-β-sulfatoethylsulfone | 1-Aminobenzene-3-β-sulfatoethylsulfone | Scarlet |
| 40 | 6-Amino-1-hydroxynaphthalene-3,5-disulfonic acid | p-Anisidine-m-sulfonic acid | 1-Amino-2,5-dimethoxybenzene-4-β-sulfatoethylsulfone | 1-Aminobenzene-3-β-sulfatoethylsulfone | Scarlet |
| 41 | 6-Methylamino-1-hydroxynaphthalene-3-sulfonic acid | p-Anisidine-m-sulfonic acid | 1-Aminobenzene-4-β-sulfatoethylsulfone | 1-Aminobenzene-3-β-sulfatoethylsulfone | Scarlet |
| 42 | 6-Methylamino-1-hydroxynaphthalene-3-sulfonic acid | p-Anisidine-m-sulfonic acid | N—Ethylaniline-3-β-sulfatoethylsulfone | 1-Aminobenzene-3-β-sulfatoethylsulfone | Scarlet |
| 43 | 6-Ethylamino-1-hydroxynaphthalene-3-sulfonic acid | p-Anisidine-m-sulfonic acid | N—Ethylaniline-3-β-sulfatoethylsulfone | 1-Aminobenzene 3-β-sulfatoethylsulfone | Scarlet |
| 44 | 6-Ethylamino-1-hydroxynaphthalene-3-sulfonic acid | p-Anisidine-m-sulfonic acid | 1-Aminobenzene-4-β-sulfatoethylsulfone | 1-Aminobenzene 3-β-sulfatoethylsulfone | Scarlet |
| 45 | 6-Amino-1-hydroxynaphthalene-3-sulfonic acid | p-Anisidine-m-sulfonic acid | β-(β-sulfatoethylsulfonyl)-ethylamine | N—Ethylaniline-3-β-sulfatoethylsulfone | Scarlet |
| 46 | 6-Amino-1-hydroxynaphthalene-3-sulfonic acid | p-Anisidine-m-sulfonic acid | β-(β-Sulfatoethylsulfonyl)-ethylamine | N—Ethylaniline-4-β-sulfatoethylsulfone | Scarlet |
| 47 | 6-Amino-1-hydroxynaphthalene-3-sulfonic acid | p-Anisidine-m-sulfonic acid | β-(β-Sulfatoethylsulfonyl)-ethylamine | 1-Aminobenzene-4-β-sulfatoethylsulfone | Scarlet |
| 48 | 6-Amino-1-hydroxynaphthalene-3-sulfonic acid | p-Anisidine-m-sulfonic acid | β-(β-Sulfatoethylsulfonyl)-ethylamine | 2-Aminonaphthalene-6-β-sulfatoethylsulfone | Scarlet |
| 49 | 6-Amino-1-hydroxynaphthalene-3-sulfonic acid | p-Anisidine-m-sulfonic acid | β-(β-Sulfatoethylsulfonyl)-ethylamine | 1-Aminobenzene-3-vinylsulfone | Scarlet |
| 50 | 6-Methylamino-1-hydroxynaphthalene-3-sulfonic acid | p-Anisidine-m-sulfonic | β-(β-Sulfatoethylsulfonyl)-ethylamine | 1-Aminobenzene-3-vinylsulfone | Scarlet |
| 51 | 6-Methylamino-1-hydroxynaphthalene-3-sulfonic acid | p-Anisidine-m-sulfonic | β-(β-Sulfatoethylsulfonyl)-ethylamine | 1-Aminobenzene-3-β-sulfatoethylsulfone | Scarlet |
| 52 | 6-Methylamino-1-hydroxynaphthalene-3-sulfonic acid | p-Anisidine-m-sulfonic | β-(β-Sulfatoethylsulfonyl)-ethylamine | 1-Aminobenzene-4-β-sulfatoethylsulfone | Scarlet |
| 53 | 6-Amino-1-hydroxynaphthalene-3-sulfonic acid | p-Anisidine-m-sulfonic | β-(β-Sulfatoethylsulfonyl)-ethylamine | 1-Amino-2-methoxybenzene-5-β-sulfatoethylsulfone | Scarlet |
| 54 | 6-Amino-1-hydroxynaphthalene-3-sulfonic acid | p-Anisidine-m-sulfonic | β-(β-Sulfatoethylsulfonyl)-ethylamine | 2-Aminonaphthalene-6-β-sulfatoethylsulfone-1-sulfonic acid | Scarlet |
| 55 | 6-Amino-1-hydroxynaphthalene-3-sulfonic acid | p-Anisidine-m-sulfonic | γ-(β-sulfatoethylsulfonyl)-propylamine | 1-Aminobenzene-3-β-sulfatoethylsulfone | Scarlet |
| 56 | 6-Amino-1-hydroxynaphthalene-3-sulfonic acid | p-Anisidine-m-sulfonic | γ-(β-sulfatoethylsulfonyl)-propylamine | 1-Aminobenzene-4-β-sulfatoethylsulfone | Scarlet |
| 57 | 6-Amino-1-hydroxynaphthalene-3-sulfonic acid | p-Anisidine-m-sulfonic acid | γ-(β-sulfatoethylsulfonyl)-propylamine | N—Ethylaniline-3-β-sulfatoethylsulfone | Scarlet |
| | 6-Methylamino-1- | p-Anisidine- | γ-(β-sulfatoethyl- | N—Ethylaniline-3- | |

-continued

| | A<br>Azo component<br>(II) | B<br>Diazo component<br>(III) | C<br>Second condensation amine component<br>(IV) | D<br>Third condensation amine component<br>(V) | E<br>Shade on cellulose |
|---|---|---|---|---|---|
| 58 | hydroxynaphthalene-3-sulfonic acid | m-sulfonic acid | sulfonyl)-propyl-amine | β-sulfatoethyl-sulfone | Scarlet |
| 59 | 6-Methylamino-1-hydroxynaphthalene-3-sulfonic acid | p-Anisidine-m-sulfonic acid | γ-(β-sulfatoethyl-sulfonyl)-propyl-amine | 1-Aminobenzene-3-β-sulfatoethyl-sulfone | Scarlet |
| 60 | 6-Methylamino-1-hydroxynaphthalene-3-sulfonic acid | p-Anisidine-m-sulfonic acid | γ-(β-sulfatoethyl-sulfonyl)-propyl-amine | 1-Aminobenzene-4-β-sulfatoethyl-sulfone | Scarlet |

EXAMPLE 5

Cyanuric chloride (18.5 parts) was dispersed in water (150 parts), and an aqueous neutral solution (250 parts) of 6-amino-1-hydroxynaphthalene-3-sulfonic acid (23.9 parts) was added to the above dispersion. The mixture was stirred at 0° to 5° C., while controlling the pH within 2 to 4, until the starting 6-amino-1-hydroxynaphthalene-3-sulfonic acid disappeared. While, 2-aminonaphthalene-1,5-disulfonic acid (30.3 parts) was diazotized in a conventional manner, and the resulting diazonium liquor was added to the above reaction mixture obtained by the first condensation reaction. The mixture was stirred at 10° to 15° C. within a pH of 6 to 8 to complete the coupling reaction. Thereafter, N-ethylaniline-3-β-sulfatoethylsulfone (33.1 parts) was added thereto, and the mixture was stirred at 30° to 50° C. within a pH of 4 to 6 to complete the second condensation reaction. Successively, 1-aminobenzene-3-β-sulfatoethylsulfone (28.1 parts) was added thereto, and the mixture was stirred at 50° to 70° C. within a pH of 4 to 6 to complete the third condensation reaction. Then, potassium chloride was added to the reaction mixture, and the precipitate separated by filtration was dried to obtain a monoazo compound of the following formula in a free acid form.

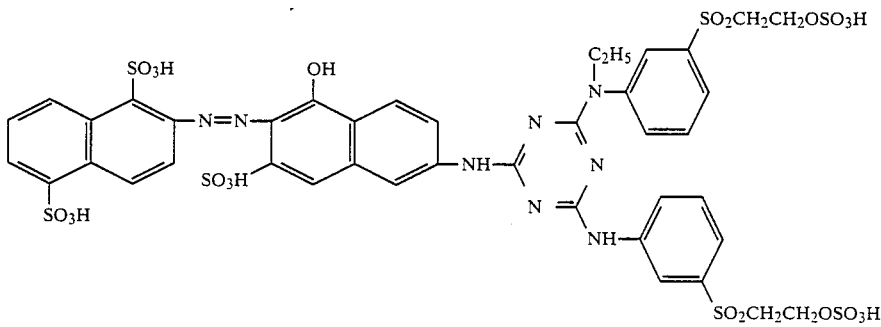

(λmax 490 nm)

EXAMPLE 6

Example 5 was repeated, except that 6-amino-1-hydroxynaphthalene-3,5-disulfonic acid and 2-aminonaphthalene-1-sulfonic acid were used in place of 6-amino-1-hydroxynaphthalene-3-sulfonic acid and 2-aminonaphthalene-1,5-disulfonic acid, respectively, thereby obtaining a monoazo compound represented by the following formula in a free acid form.

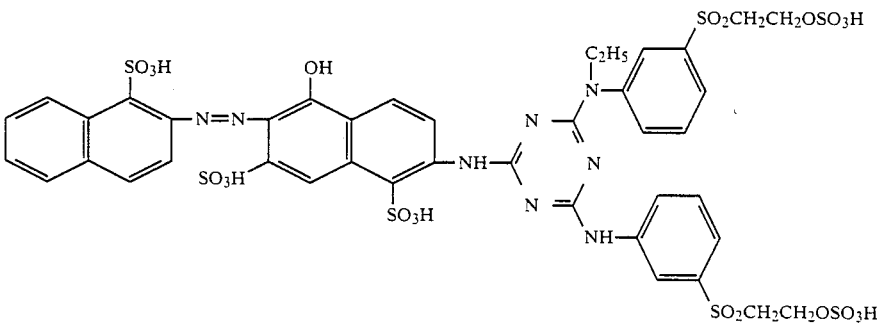

(λmax 500 nm)

EXAMPLE 7

Example 6 was repeated, except that 6-N-methylamino-1-hydroxynaphthalene-3-sulfonic acid was used in place of 6-amino-1-hydroxynaphthalene- 3,5-disulfonic acid, thereby obtaining a monoazo compound represented by the following formula in a free acid form.

the fourth column and another amine compund (V) in the fifth column were used in place of 6-amino-1-hydroxynaphthalene-3-sulfonic acid, 2-aminonaphtha-

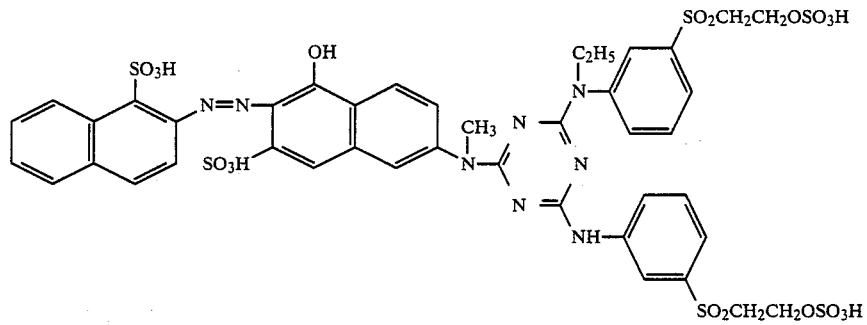

(λmax 490 nm)

EXAMPLE 8

Example 5 was repeated, except that the aminonaphthalene sulfonic acid (II) as shown in the second column of the following table, the aromatic amine compound (III) in the third column, the amine compound (IV) in the fourth column and another amine compund (V) in the fifth column were used in place of 6-amino-1-hydroxynaphthalene-3-sulfonic acid, 2-aminonaphthalene-1,5-disulfonic acid, N-ethylaniline-3-β-sulfatoethylsulfone and 1-aminobenzene-3-β-sulfatoethylsulfone, respectively, thereby obtaining the corresponding monoazo compound, which color on cellulose fibers was as shown in the sixth column.

| Run No. | Aminonaphthalene sulfonic acid (II) | Aromatic amine compound (III) | Amine compound (IV) | Another amine compound (V) | Shade on cellose fiber |
|---|---|---|---|---|---|
| 1 | 7-amino-4-hydroxy-naphthalene-2-sulfonic acid | 2-amino-naphthalene-1,6-disulfonic acid | 3-aminophenyl-β-sulfatoethylsulfone | 3-aminophenyl-β-sulfatoethylsulfone | Orange |
| 2 | " | " | " | 3-aminophenyl-vinylsulfone | " |
| 3 | " | " | " | 4-aminophenyl-β-sulfatoethylsulfone | " |
| 4 | " | " | " | 4-(N-ethylamino)phenyl-β-sulfatoethylsulfone | " |
| 5 | " | 2-amino-naphthalene-1,5-disulfonic acid | 3-aminophenyl-vinylsulfone | 3-(N-ethylamino)phenyl-vinylsulfone | Orange |
| 6 | " | " | 3-aminophenyl-β-sulfatoethylsulfone | " | " |
| 7 | " | " | 4-(N-ethylamino)phenyl-vinylsulfone | " | " |

-continued

| Run No. | Aminonaphthalene sulfonic acid (II) | Aromatic amine compound (III) | Amine compound (IV) | Another amine compound (V) | Shade on cellulose fiber |
|---|---|---|---|---|---|
| 8 | " | " | 4-H$_2$N-C$_6$H$_4$-SO$_2$CH$_2$CH$_2$OSO$_3$H | 4-H$_2$N-C$_6$H$_4$-SO$_2$CH$_2$CH$_2$OSO$_3$H | " |
| 9 | 2-amino-5-hydroxynaphthalene-7-sulfonic acid | 2-amino-1-sulfo-6-sulfonaphthalene (2-amino-naphthalene-1,6-disulfonic acid) | 4-H$_2$N-C$_6$H$_4$-SO$_2$CH$_2$CH$_2$OSO$_3$H | 4-(N-CH$_3$)amino-C$_6$H$_4$-SO$_2$CH$_2$CH$_2$OSO$_3$H | Orange |
| 10 | " | " | " | 3-(N-CH$_2$CH$_2$OH)amino-C$_6$H$_4$-SO$_2$CH$_2$CH$_2$OSO$_3$H | " |
| 11 | " | " | 3-H$_2$N-C$_6$H$_4$-SO$_2$CH$_2$CH$_2$OSO$_3$H | 2-OCH$_3$-4-H$_2$N-C$_6$H$_3$-SO$_2$CH$_2$CH$_2$OSO$_3$H | " |
| 12 | " | " | " | 2-SO$_3$H-4-H$_2$N-C$_6$H$_3$-SO$_2$CH$_2$CH$_2$OSO$_3$H | " |
| 13 | 2-amino-5-hydroxynaphthalene-7-sulfonic acid | 2-amino-1,5-disulfonaphthalene | 3-H$_2$N-C$_6$H$_4$-SO$_2$CH$_2$CH$_2$OSO$_3$H | 2-OCH$_3$-5-H$_2$N-C$_6$H$_3$-SO$_2$CH$_2$CH$_2$OSO$_3$H | Orange |

-continued

| Run No. | Aminonaphthalene sulfonic acid (II) | Aromatic amine compound (III) | Amine compound (IV) | Another amine compound (V) | Shade on cellose fiber |
|---|---|---|---|---|---|
| 14 | " | " | | 4-amino-3-methylphenyl β-sulfatoethyl sulfone (H$_2$N–C$_6$H$_3$(CH$_3$)–SO$_2$CH$_2$CH$_2$OSO$_3$H) | " |
| 15 | " | " | | 4-amino-2-ethylphenyl β-sulfatoethyl sulfone (H$_2$N–C$_6$H$_3$(C$_2$H$_5$)–SO$_2$CH$_2$CH$_2$OSO$_3$H) | " |
| 16 | " | " | | 4-amino-3-chlorophenyl β-sulfatoethyl sulfone (H$_2$N–C$_6$H$_3$(Cl)–SO$_2$CH$_2$CH$_2$OSO$_3$H) | " |
| 17 | 2-amino-5-hydroxy-7-naphthalene sulfonic acid | 2-amino-1,5-naphthalenedisulfonic acid | 4-amino-phenyl β-sulfatoethyl sulfone (H$_2$N–C$_6$H$_4$–SO$_2$CH$_2$CH$_2$OSO$_3$H) | 6-amino-1-naphthyl β-sulfatoethyl sulfone | Orange |
| 18 | " | " | | 7-amino-1-naphthyl β-sulfatoethyl sulfone | " |
| 19 | " | " | | 2-amino-1-sulfo-6-naphthyl β-sulfatoethyl sulfone | " |

| Run No. | Aminonaphthalene sulfonic acid (II) | Aromatic amine compound (III) | Amine compound (IV) | Another amine compound (V) | Shade on cellose fiber |
|---|---|---|---|---|---|
| 20 | 6-amino-1-hydroxy-3-naphthalenesulfonic acid (HO, NH₂, SO₃H on naphthalene) | 2-amino-1,5-naphthalenedisulfonic acid | 2,6-diamino... 1-H₂N-naphthalene-SO₃H with SO₂CH₂CH₂OSO₃H | H₂N-naphthalene(SO₃H)-SO₂CH₂CH₂OSO₃H | Orange |
| 21 | " | 2-amino-1-naphthalenesulfonic acid | 3-aminophenyl-SO₂CH₂CH₂OSO₃H | 3-(ethylamino)phenyl-SO₂CH₂CH₂OSO₃H | " |
| 22 | " | 3-amino-naphthalene-2,7-disulfonic acid-(5-SO₃H) | " | 4-(methylamino)phenyl-SO₂CH₂CH₂OSO₃H | " |
| 23 | " | 2-amino-1-naphthalenesulfonic-7-SO₃H | 4-(ethylamino)phenyl-SO₂CH₂CH₂OSO₃H | H₂N-naphthalene(SO₃H)-SO₂CH₂CH₂OSO₃H | " |
| 24 | 6-amino-1-hydroxy-3-naphthalenesulfonic acid | 2-amino-1-naphthalenesulfonic acid (with 7-SO₃H) | 3-aminophenyl-SO₂CH₂CH₂OSO₃H | H₂N-naphthalene(SO₃H)-SO₂CH₂CH₂OSO₃H | Orange |
| 25 | 2-amino-1-sulfo-5-hydroxy-7-naphthalene | 2-amino-1-sulfo-5-naphthalenesulfonic acid | 3-aminophenyl-SO₂CH₂CH₂OSO₃H | 3-aminophenyl-SO₂CH₂CH₂OSO₃H | " |

-continued

| Run No. | Aminonaphthalene sulfonic acid (II) | Aromatic amine compound (III) | Amine compound (IV) | Another amine compound (V) | Shade on cellose fiber |
|---|---|---|---|---|---|
| 26 | " | " | " | H₂N–C₆H₄–SO₂CH=CH₂ | " |
| 27 | 2-amino-5-hydroxy-1,7-disulfonic naphthalene | 2-amino-1,5-disulfonic naphthalene | 3-amino-phenyl-SO₂CH₂CH₂OSO₃H | 3-(C₂H₅NH)-5-(SO₂CH₂CH₂OSO₃H)-aniline | Orange |
| 28 | " | " | " | 4-methoxy-3-amino-phenyl-SO₂CH₂CH₂OSO₃H | " |
| 29 | " | " | " | 2-amino-8-sulfo-6-(SO₂CH₂CH₂OSO₃H)-naphthalene | Reddish orange |
| 30 | 2-amino-5-hydroxy-1,7-disulfonic naphthalene | 2-amino-1-sulfonic naphthalene | 3-amino-phenyl-SO₂CH₂CH₂OSO₃H | 4-amino-phenyl-SO₂CH₂CH₂OSO₃H | Reddish orange |
| 31 | 2-(CH₃NH)-5-hydroxy-7-sulfonic naphthalene | 2-amino-1-sulfonic naphthalene | " | " | Reddish orange |

-continued

| Run No. | Aminonaphthalene sulfonic acid (II) | Aromatic amine compound (III) | Amine compound (IV) | Another amine compound (V) | Shade on cellose fiber |
|---|---|---|---|---|---|
| 32 | " | ![2-amino-1,5-naphthalenedisulfonic acid: NH₂ at position, SO₃H groups] | " | ![3-aminophenyl-SO₂CH₂CH₂OSO₃H with H₂N] | Reddish orange |
| 33 | " | ![2-amino-1,5-naphthalenedisulfonic acid] | " | ![N-ethyl-3-amino-phenyl-SO₂CH₂CH₂OSO₃H with C₂H₅-HN] | Orange |
| 34 | ![6-hydroxy-2-(methylamino)naphthalene-3-sulfonic acid: CH₃-NH, OH, SO₃H] | " | ![3-aminophenyl-SO₂CH₂CH₂OSO₃H with H₂N] | ![2-methoxy-5-amino-phenyl-SO₂CH₂CH₂OSO₃H with OCH₃, H₂N] | Orange |
| 35 | " | " | ![4-aminophenyl-SO₂CH=CH₂ with H₂N] | " | " |
| 36 | " | ![3-amino-2,7-naphthalenedisulfonic acid: NH₂, SO₃H groups] | ![3-aminophenyl-SO₂CH₂CH₂OSO₃H with H₂N] | ![3-aminophenyl-SO₂CH₂CH₂OSO₃H with H₂N] | Reddish orange |
| 37 | " | ![3-amino-2,7-naphthalenedisulfonic acid] | " | ![2-amino-naphthalene with SO₃H and SO₂CH₂CH₂OSO₃H groups, H₂N] | Reddish orange |

-continued

| Run No. | Aminonaphthalene sulfonic acid (II) | Aromatic amine compound (III) | Amine compound (IV) | Another amine compound (V) | Shade on cellose fiber |
|---|---|---|---|---|---|
| 38 | 2-(N-methylamino)-5-hydroxy-naphthalene-7-sulfonic acid (OH, NHCH₃, SO₃H substituted naphthalene) | 2-amino-naphthalene-3,6,8-trisulfonic acid (NH₂, SO₃H, SO₃H, SO₃H) | 2-amino-naphthalene-5-(SO₂CH₂CH₂OSO₃H) | 2-amino-naphthalene-1-SO₃H, 6-SO₂CH₂CH₂OSO₃H | Reddish orange |
| 39 | 2-(N-ethylamino)-5-hydroxy-naphthalene-7-sulfonic acid (OH, NHC₂H₅, SO₃H) | 2-amino-naphthalene-1-sulfonic acid | 3-amino-phenyl-SO₂CH₂CH₂OSO₃H | 4-amino-phenyl-SO₂CH₂CH₂OSO₃H | Reddish orange |
| 40 | ″ | 2-amino-naphthalene-1,5-disulfonic acid | ″ | 2-amino-naphthalene-1-SO₃H, 6-SO₂CH₂CH₂OSO₃H | Orange |
| 41 | 2-amino-5-hydroxy-naphthalene-7-sulfonic acid (NH₂, OH, SO₃H) | 2-amino-naphthalene-1,5-disulfonic acid | 3-amino-phenyl-SO₂CH₂CH₂OSO₃H | 2-amino-5-(SO₂CH₂CH₂OSO₃H)-benzoic acid (COOH, NH₂) | Orange |
| 42 | ″ | 2-amino-naphthalene-1,5-disulfonic acid | 4-amino-3-bromo-phenyl-SO₂CH₂CH₂OSO₃H | 2-ethoxy-5-(SO₂CH₂CH₂OSO₃H)-aniline (OC₂H₅, NH₂) | ″ |

DYEING EXAMPLE 1

Each monoazo compound (0.3 part) obtained in Examples 1 to 8 was dissolved in water (200 parts), and sodium sulfate (20 parts) and cotton (10 parts) were added thereto in this order. The dyeing bath was heated to 50° C. After 30 minutes, sodium carbonate (4 parts) was added to the bath, and dyeing was continued for 1 hour at that temperature. Thereafter, the cotton was washed with water and soaped to obtain a dyed product of extremely deep color excellent in fastness properties, particularly chlorine fastness, light fastness and perspiration-light fastness, with a superior build-up property.

DYEING EXAMPLE 2

Each monoazo compound (0.3 part) obtained in Examples 5 to 8 was dissolved in water (150 parts), and sodium sulfate (30 parts) and cotton (10 parts) were added thereto in this order. The dyeing bath was heated to 60° C. After 20 minutes, sodium carbonate (4 parts) was added thereto, and dyeing was continued for 1 hour at that temperature. The cotton was washed with water and soaped to obtain a dyed product of an extremely deep color excellent in various fastness properties, particularly chlorine fastness, light fastness and perspiration-light fastness with a superior build-up property.

DYEING EXAMPLE 3

| Composition of color paste | |
|---|---|
| Each monoazo compound obtained in Examples 5 to 8 | 4 parts |
| Urea | 5 parts |
| Sodium alginate (5%), thickener | 50 parts |
| Hot water | 25 parts |
| Sodium hydrogencarbonate | 2 parts |
| Water | 14 parts |

Mercerized cotton broad cloth was printed with the color paste of the above composition, pre-dried, steamed at 120° C. for 5 minutes, washed with hot water, soaped, again washed with hot water and dried, thereby obtaineing a printed product of an extremely deep color excellent in various fastness properties, particularly chlorine fastness, light fastness and perspiration-light fastness, with a superior build-up property.

DYEING EXAMPLE 4

Each monoazo compound (15 parts) obtained in Examples 1 to 4 and urea (50 parts) were dissolved in hot water (200 parts). To this solution were added a paste (400 parts) consisting of sodium alginate (40 parts) and water (960 parts), and sodium hydrogencarbonate (20 parts). To the resulting paste were added water and the paste to make the whole into 1000 parts. Cotton cloth was printed with thus prepared printing paste, dried, steamed at 100° to 103° C. for 5 minutes, washed with cool water and then hot water, boil-soaped, again washed and then dried, thereby obtaining a printed product of an extremely deep scarlet color excellent in various fastness properties.

DYEING EXAMPLE 5

Each monoazo compound (25 parts) obtained in Examples 5 to 8 was dissolve d in hot water, and the solution was cooled to 25° C. Aqueous 32.5% sodium hydroxide solution (5.5 parts) and 50°Be' water glass (150 parts) were added thereto, and water was added to make the whole into 1000 parts at 25° C. to obtain a padding liquor. Immediately thereafter, cotton cloth was padded with the padding liquor and batched up, and the cloth wrapped tightly with a polyethylene film was allowed to stand in a room kept at 20° C.

Above manner was repeated to obtain a padded cotton cloth, which was then wrapped tightly with a polyethylene film, and allowed to stand in a room kept at 5° C.

Both cloths were allowed to stand for 20 hours, and thereafter washed with cool water and then hot water, soaped with a boiling detergent, washed with cool water and then dried.

There was observed almost no difference in their color shade and depth between the dyed products obtained after standing at 5° C. and 20° C. each for 20 hours. In this cold batch-up dyeing method, each monoazo compound was found to have superior build-up property.

What is claimed is:

1. A monoazo compound represented by the following formula in a free acid form,

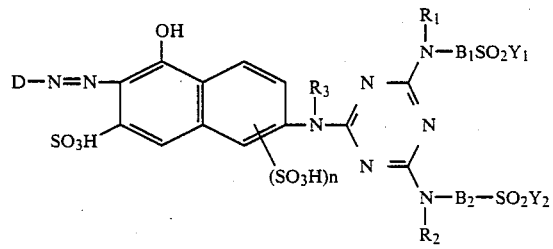

wherein D is a sulfophenyl group of the following formula in a free acid form,

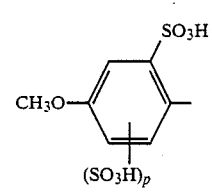

in which p is 0 or 1, or a sulfonaphthyl group of the following formula in a free acid form,

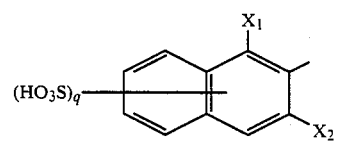

in which any one of $X_1$ and $X_2$ is sulfo and the other is hydrogen, and q is 0, 1 or 2; $R_1$, $R_2$ and $R_3$ independently of one another are each hydrogen or alkyl unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl; $B_1$ and $B_2$ independently of one another are each phenylene unsubstituted or substituted with methyl, methoxy, ethyl, ethoxy, chloro, bromo, sulfo or carboxy, naphthylene unsubstituted or substituted with sulfo, or alkylene, provided that at least one of $B_1$ and $B_2$ is the phenylene or naphthylene; $Y_1$ and $Y_2$ independently of one another are each —CH=CH$_2$ or —CH$_2$CH$_2$Z in which Z is a group capable of being split by the action of an alkali; and n is 0 or 1.

2. A monoazo compound according to claim 1, wherein $Y_1$ and $Y_2$ independently of one another are each $-CH=CH_2$ or $-CH_2CH_2Z$ in which Z is a group capable of being split by the action of an alkali and is selected from the group consisting of sulfuric acid ester, thiosulfuric acid ester, acetic acid ester, phosphoric acid ester, acetic acid ester, phosphoric acid ester and halogen.

3. A monoazo compound according to claim 1, wherein the compound is represented by the following formula in a free acid form,

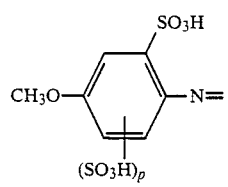

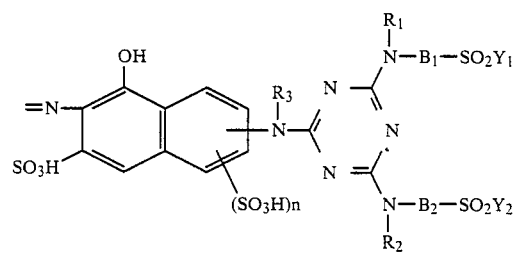

4. A monoazo compound according to claim 1, wherein the compound is represented by the following formula in a free acid form,

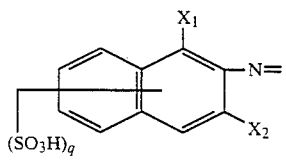

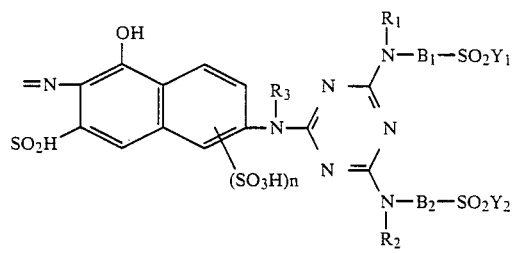

5. A monoazo compound according to claim 1, wherein $R_1$, $R_2$ and $R_3$ independently of one another are each hydrogen, methyl or ethyl.

6. A monoazo compound according to claim 1, wherein $B_1$ and $B_2$ independently of one another are each phenylene unsubstituted or substituted with methyl, methoxy, ethyl, ethoxy, chloro, bromo, sulfo or carboxy, or naphthylene unsubstituted or substituted with sulfo.

7. A monoazo compound according to claim 1, wherein $B_1$ and $B_2$ independently of one another are each phenylene unsubstituted or substituted with methyl or methoxy.

8. A monoazo compound represented by the following formula in a free acid form,

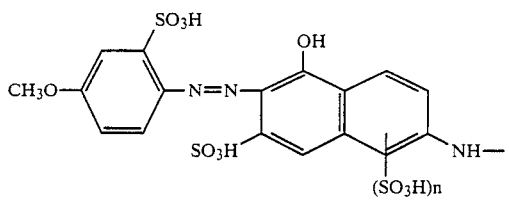

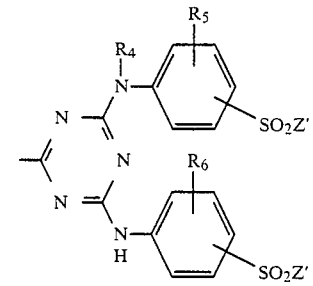

wherein $R_4$ is hydrogen, methyl or ethyl; $R_5$ and $R_6$ independently of one another are each hydrogen, methyl or methoxy; $Z'$ is $-CH_2CH_2OSO_3H$ or $-CH=CH_2$; and n is 0 or 1.

9. A monoazo compound represented by the following formula in a free acid form,

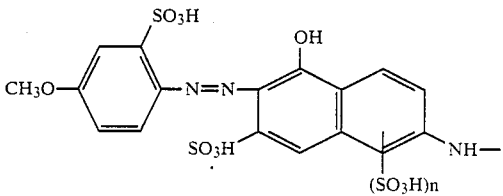

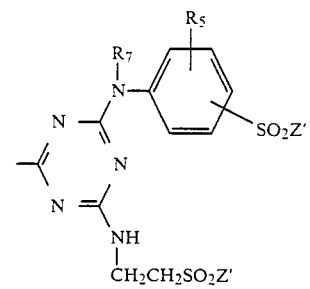

wherein $R_5$ is hydrogen, methyl or methoxy; $R_7$ is hydrogen, methyl or ethyl; $Z'$ is $-CH_2CH_2OSO_3H$ or $-CH=CH_2$; and n is 0 or 1.

10. A monoazo compound represented by the following formula in a free acid form,

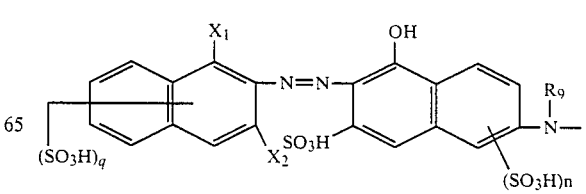

-continued

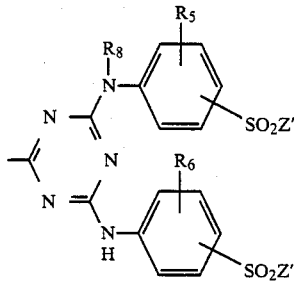

wherein $R_5$ and $R_6$ independently of one another are each hydrogen, methyl or methoxy; $R_8$ and $R_9$ are independently of one another are each hydrogen, methyl or ethyl; any one of $X_1$ and $X_2$ is sulfo and the other is hydrogen; $Z'$ is $-CH_2CH_2OSO_3H$ or $-CH=CH_2$; n is 0 or 1; and q is 0, 1 or 2.

11. A monoazo compound according to claim 1, wherein $R_1$, $R_2$ and $R_3$ independently of one another are each hydrogen or alkyl having 1 to 4 carbon atoms unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl.

12. A monoazo compound according to claim 1, wherein $B_1$ and $B_2$ independently of one another are each phenylene unsubstituted or substituted with one or two members selected from the group consisting of methyl, methoxy, ethyl, ethoxy, chloro, bromo, sulfo and carboxy, naphthylene unsubstituted or substituted with one of sulfo, or alkylene having 1 to 8 carbon atoms, provided that at least one of $B_1$ and $B_2$ is phenylene or naphthylene.

* * * * *